RIG FOR WORK AT SEA, IN LAKES, LAGOONS

Filed Dec. 29, 1966 10 Sheets-Sheet 1

INVENTORS
NICOLAS ESQUILLAN
HENRI HOUDIN
BY Young + Thompson
ATTYS.

INVENTORS
NICOLAS ESQUILLAN
HENRI HOUDIN
BY Young & Thompson
ATTYS.

INVENTORS
NICOLAS ESQUILLAN
HENRI HOUDIN
BY Young + Thompson
ATTYS.

INVENTORS
NICOLAS ESQUILLAN
HENRI HOUDIN
BY Young + Thompson
ATTYS

RIG FOR WORK AT SEA, IN LAKES, LAGOONS

INVENTORS
NICOLAS ESQUILLAN
HENRI HOUDIN
BY Young + Thompson
ATTYS.

INVENTORS

NICOLAS ESQUILLAN
HENRI HOUDIN

BY Young + Thompson
ATTYS.

INVENTORS
NICOLAS ESQUILLAN
HENRI HOUDIN
BY Young & Thompson
ATTYS.

INVENTORS
NICOLAS ESQUILLAN
HENRI HOUDIN
BY Young & Thompson
ATTYS.

RIG FOR WORK AT SEA, IN LAKES, LAGOONS

Filed Dec. 29, 1966 10 Sheets-Sheet 9

INVENTORS
NICOLAS ESQUILLAN
HENRI HOUDIN
BY Young & Thompson
ATTYS.

RIG FOR WORK AT SEA, IN LAKES, LAGOONS

Filed Dec. 29, 1966 10 Sheets-Sheet 10

INVENTORS
NICOLAS ESQUILLAN
HENRI HOUDIN
BY Young & Thompson
ATTYS.

3,466,878

RIG FOR WORK AT SEA, IN LAKES, LAGOONS

Nicolas Esquillan and Henri Houdin, Paris, France, assignors to Société des Entreprises Boussiron, Paris, France, a corporation of the French Republic Filed Dec. 29, 1966, Ser. No. 606,109
Claims priority, application France, Jan. 17, 1966, 46,095
Int. Cl. E02d *21/00;* E02b *17/00;* B63b *35/44*
U.S. Cl. 61—46.5 4 Claims

ABSTRACT OF THE DISCLOSURE

A rig for work at sea, in lakes, lagoons, comprising at least one structure supported above the water on permanent piles, each structure being made of concrete and arranged to be self-floating and being equipped with a set of provisional piles. After being launched, the structure is towed to its working site, then raised to its final height by means of the provisional piles, after which the permanent piles are erected to form the final supports, the provisional piles then being removed.

The present invention relates to a rig for supporting equipment above a surface of water such as the sea, a lake, lagoon and the like.

Rigs of this kind are already known, which in manner known per se comprise a platform supported above the water on a cluster of column piles anchored in the bed below the rig.

Different methods have already been suggested for the construction of such rigs intended specifically for performing oil drilling operations, the rigs being adapted for the performance of all the operations pertaining to oil drilling, as well as of subsequent exploitation of oil fields.

In a known form of rig, the platform is arranged to float during the erection of the supporting piles or posts, and is then raised to its final level when erection of these piles has been completed. A disadvantage of this construction method resides in the fact that throughout the period of erection of the piles the platform floats although it is anchored; and under these conditions, the construction process is possible only on water surfaces which are perfectly calm. This method of construction is therefore very difficult at sea, where the platform is exposed to the action of the swell or tide throughout the period of erection of the piles, which is a long and difficult operation.

In another known form of rig, the platform is made of metal and does not float; in this case, it is taken to the site at which it is to be installed by a lighter or barge, then raised above the surface of the water by provisional piles associated therewith.

Apart from the fact that this method is not very practical because of the substantial bulk of the elements to be handled, it involves substantial dangers at the instant of separation of the platform from the barge or lighter, despite the presence of special dampers placed between the barge and the platform.

The main object of the present invention is to provide a rig and a method of construction thereof which eliminates the aforesaid disadvantages.

According to the present invention, a rig for supporting equipment above a surface of water at a selected site comprises a floatable structure including a platform, to which structure is attached a set of at least three provisional piles longer than the water depth at the selected site, equipment for raising and lowering the provisional piles relative to the structure whereby the platform may be raised on the provisional piles to an operative position above the level of the water, and equipment for placing into position permanent piles for supporting the platform when the provisional piles are removed.

It will be understood that, in these circumstances, the construction of the rig is performed in rational manner and in satisfactory conditions of substantially enhanced safety, since the structure as raised to its final level on its provisional piles is not affected by the action of the swell and/or of currents, so that the construction of the final permanent piles or supports is much facilitated.

The rig may be arranged to form a platform for performing oil drilling operations; it may also be arranged for construction of bridge piers of any nature, or else it may be intended to form a supporting base for beacons, buoys or other devices and constructions requiring a firm support in deep water.

The platform may be of any form, for example polygonal, but is preferably rectangular having fixture areas for the permanent piles situated close to the four corners of the platform. The permanent piles, which may be of column type, are preferably arranged as at least three elementary groups, each of the groups comprising at least two piles inclined in divergent directions from a shared fixture area. The platform is preferably formed predominantly of concrete, and may include compartments for storage of products, stores, workshops and living quarters.

The provisional piles may either be accommodated in vertical shafts in the platform, or alternatively may be carried by caissons which form part of the floatable structure and which are removably fastened to the platform.

In order that the invention may be more clearly understood, some embodiments thereof will now be described by way of example, with reference to the accompanying drawings, in which:

FIGURES 1 to 10 show diagrammatically the different stages of construction and erection of one embodiment of rig intended specifically for oil drilling operations, as well as for all operations pertaining to this technique, and for the subsequent exploitation of the oil fields.

Figure 1:
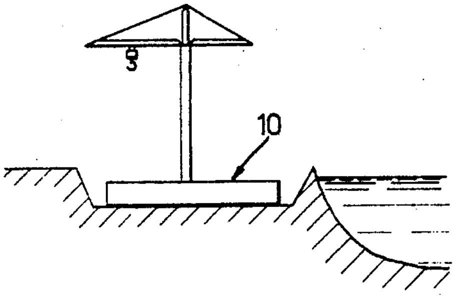
FIGURES 1 to 10 show diagrammatically the erection of a rig for oil drilling operations.
Figure 12:
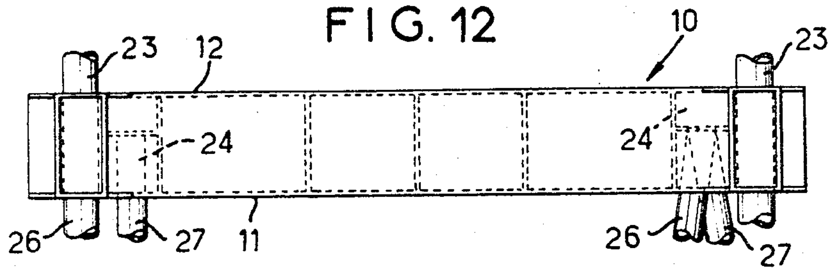
FIGURES 11 to 13 show a structure forming the platform of the rig of FIGS. 1 to 10.
Figure 11:
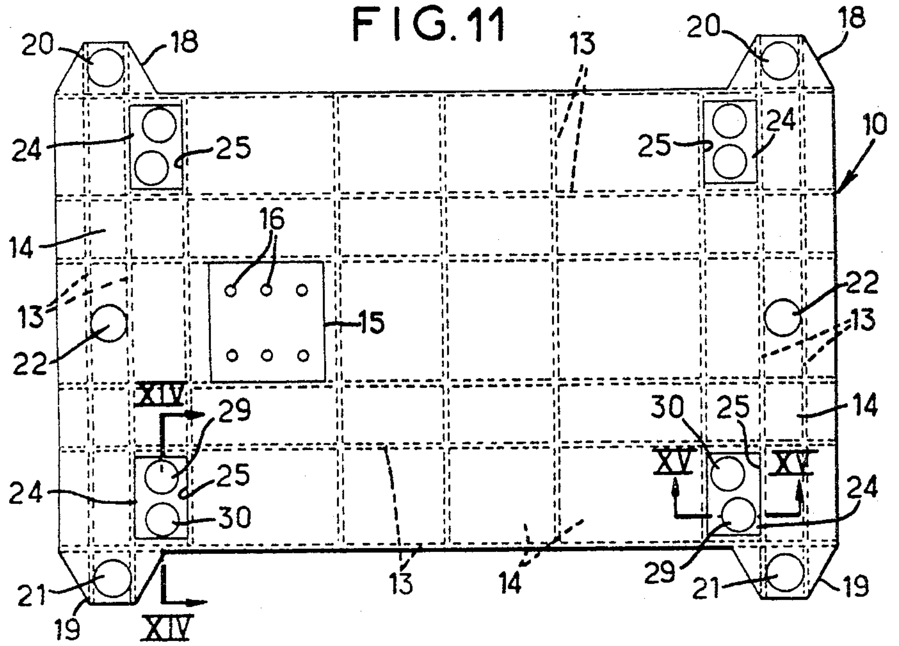
Figure 13:
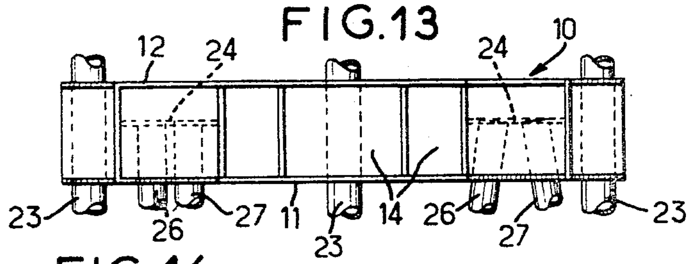

As shown in FIGURE 1, a platform 10 may for example be constructed in a harbour dock, in a floating dock, in a bed prepared on the shore of a bay, of a lagoon, or other stretches of water, which bed is below the level of the top surface of the water, but from which water is excluded. A platform of this kind may also be produced by means of prefabricated elements assembled appropriately after launching, or by any analogous means. This platform, shown in greater detail in FIGURES 11 to 13, has a generally parallelepipedal form, comprising a top floor or slab 12 and bottom floor or slab 11, between which main beams 13 connect the provisional and permanent piles, forming compartments 14 which may be employed subsequently for storage of liquid or pulverulent products, or as workshops, or else as living spaces. The top slab or deck 12 has an opening 15 situated in alignment with apertures 16 provided in the bottom slab 11 for passage of drilling mechanisms; the apertures 16 may be closed off by means of plugs or left open, in which latter case the compartment receiving water up to the flotation line is isolated from the other compartments 14.

Figure 3:
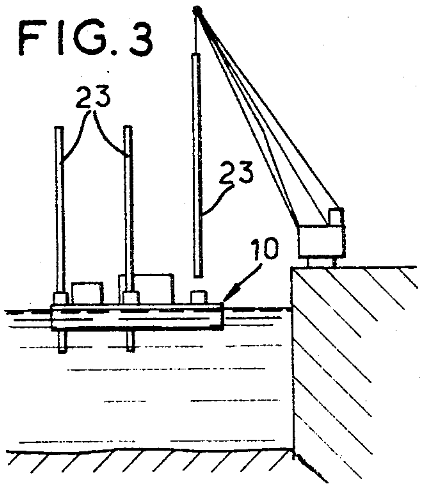

Each of the short sides of the platform has extension 18, 19 in which are provided shafts 20, 21 extending perpendicularly to the slabs or floors, as well as a central shaft 22 extending in the same direction as shafts 20, 21. These shafts are intended to slidably receive provisional piles 23 (see also FIGURES 3). Close to each of its corners, the platform includes a compartment 24 accessible through a top opening 25; these compartments are intended to receive the extremities of the permanent piles 26, 27 whereof the bottom portions ensure the anchoring of the platform in the ground. The compartments 24 each receive a pair of piles, and in order to ensure their fastening and correct orientation, these compartments are provided with a horizontal partition or bulkhead 28 having holes 29, 30 which are displaced horizontally from holes 31, 32 provided in the bottom slab. By appropriate displacement of the holes, one thus obtains a socket or well for each pile, which is angled relative to the vertical, and thus imparts a certain inclination of the piles.

The holes 29, 30, 31 and 32 are made in such manner as to impart the desired angle of inclination to the permanent piles, the number of these piles and their features being variable according to the conditions in which the rig is to be employed.

In general manner, systems comprising eight permanent piles ensure the highest resistance against external and internal stresses exerted on the structure, that is to say by the swell, currents, wind, the actual weight of the structure and additional loads; in addition they permit a very slight displacement of the structure in the horizontal plane under the action of maximum stresses.

Several arrangements of the piles may be envisaged, as shown in FIGURES 16 to 19. In a first case, wells 37, 38 are provided close to the corners 35 and 36 of the platform, these wells being aligned parallel to the lateral sides of the platform, and divergently inclined along the longitudinal direction, whereas the wells 41, 42 provided close to the corners 39, 40, are aligned in the longitudinal direction of the platform and are divergently inclined parallel to the lateral sides of the platform.

Figure 17:
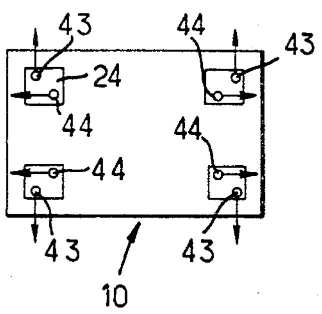

In another arrangement shown in FIGURE 17, it is apparent that each compartment 24 comprises a well 43 which is inclined outwards parallel to the short sides, and a well 44 which is equally inclined outwards parallel to the longitudinal sides of the platform.

Figure 18:
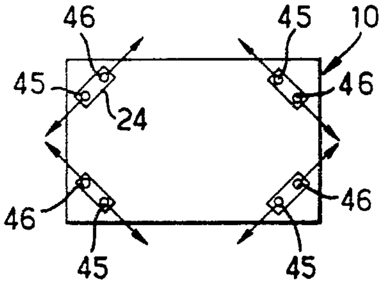

In another arrangement illustrated in FIGURE 18, the compartments 24 comprise wells 45, 46 extending diagonally in each corner.

Figure 19:
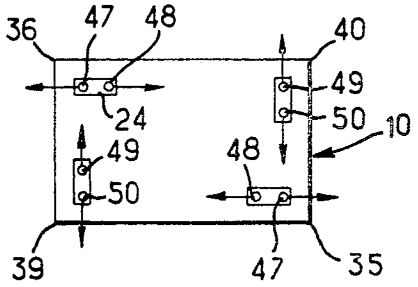

In a further arrangement shown in FIGURE 19, the wells formed by the holes 29, 30 and 31, 32 are adapted to position the piles 26, 27 sited towards the corners 39, 40 inclined in the transverse direction of the platform, being divergent at either side of a vertical line, whereas the holes 29, 30 and 31, 32 situated in the corners 35, 36 are adapted to position the piles inclined parallel to the longitudinal direction.

Prior to its launching, the platform thus constructed is advantageously equipped with mechanisms for performing the erection operations, such as jacks for handling piles, concrete production plant, and handling or other mechanisms.

Figure 2:
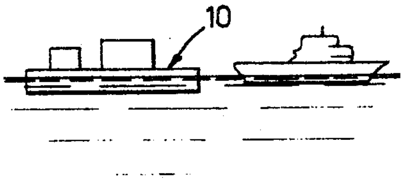
Figure 4:
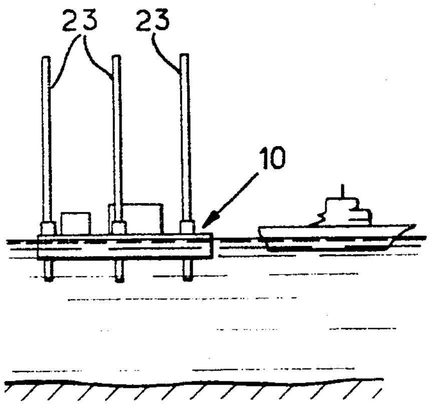

The platform is launched when ready (FIGURE 2), and then towed if appropriate to a suitable sit on which it receives the provisional piles 23 (FIGURE 3) which are inserted into the vertical shafts 20, 21, 22; these piles being locked in satisfactory position by means of the jacks or other clamping elements, the platform may then be towed to its site of erection (FIGURE 4).

The provisional piles 23 may be of various types and may be formed by tubes, or circular, square or polygonal sections, and may also be produced in the form of latticed structures. Tubular piles may be formed in one piece if appropriate handling mechanisms are available, or in the form of several lengths assembled at the erection site of the platform by welding in particular, or else by means of assembling collars.

Figure 5:
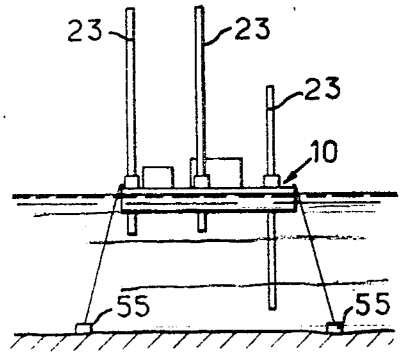
Figure 6:
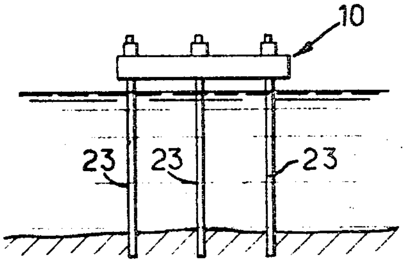
Figure 7:
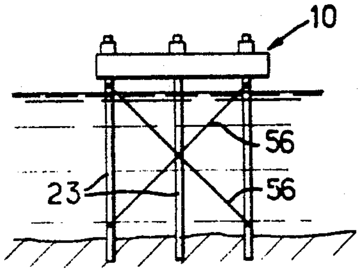
Figure 8:
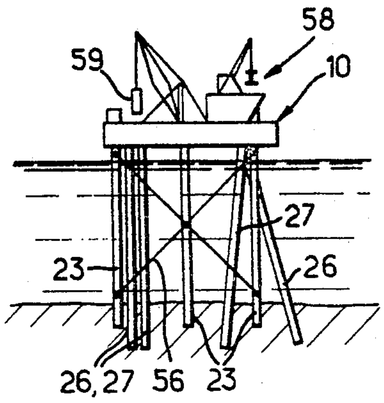

The platform having been brought to its working site, it is immobilised by means of mooring blocks or the like 55; once this operation has been performed, the provisional piles 23 are lowered and when these bear normally on the bottom, the jacks are operated until the piles cease to dig in, so that the platform is raised upwards by reaction to a certain height above the surface of the water. This stage of the operation is shown in FIGURES 5 and 6. The platform is then situated in its final position, the moorings are hoisted and the provisional piles are stayed or guyed by means of cables 56 (FIGURE 7).

The permanent piles may then be assembled on board the platform itself, its upper slab or deck bearing drilling and concreting plant, as well as the handling and hoisting mechanisms needed for installation of the permanent piles 26, 27.

Figure 20:
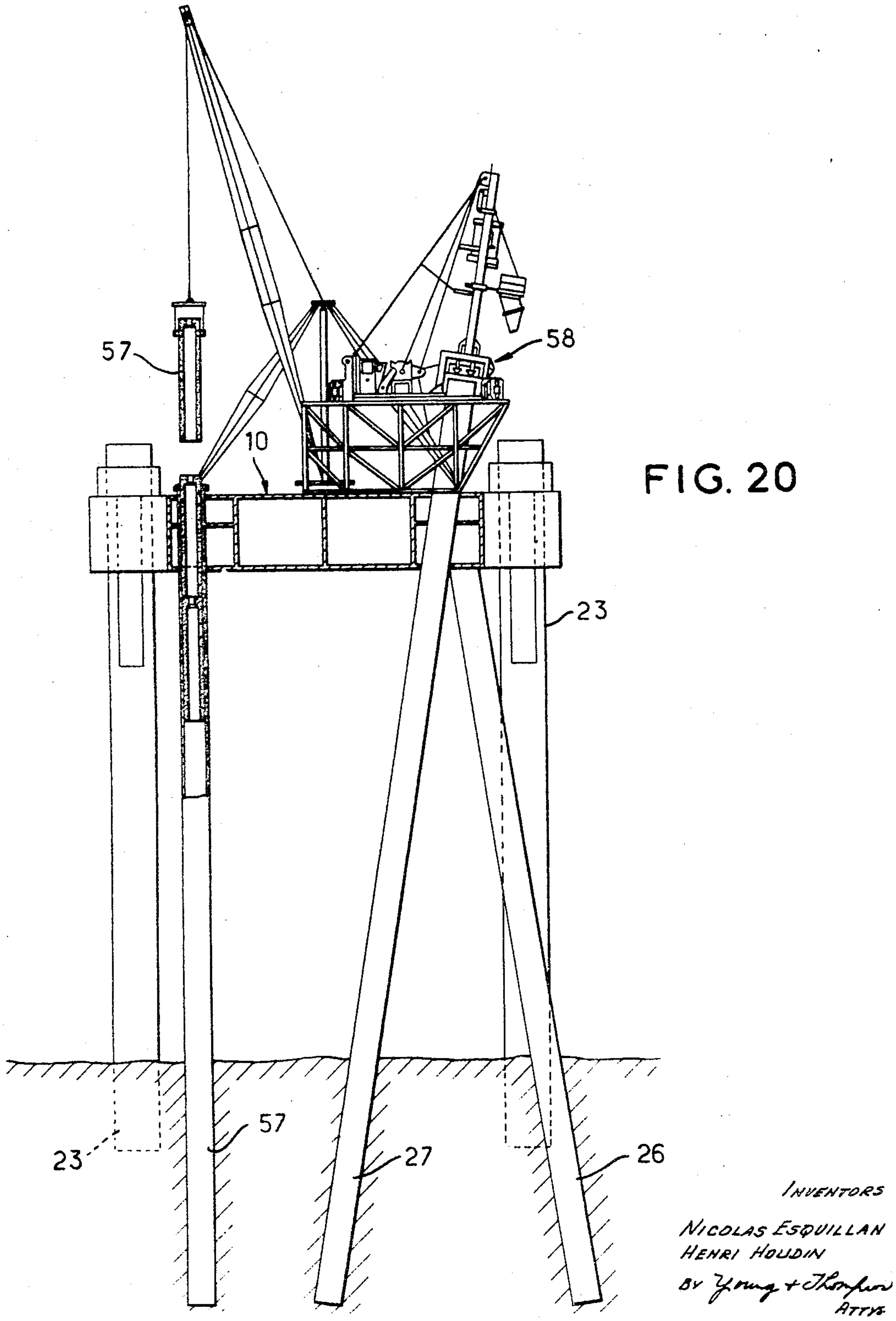
FIGURES 20 and 21 show different stages in the construction of the permanent piles.
Figure 21:
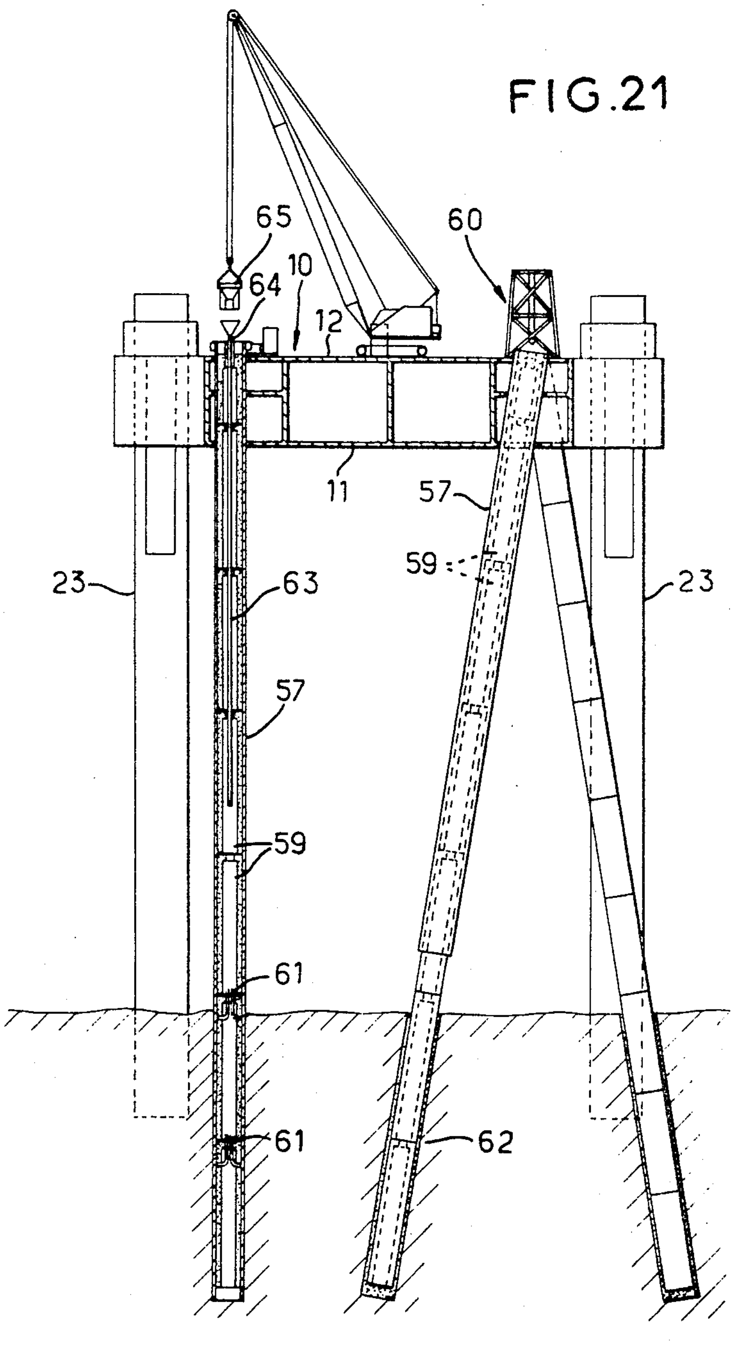
Figure 23:
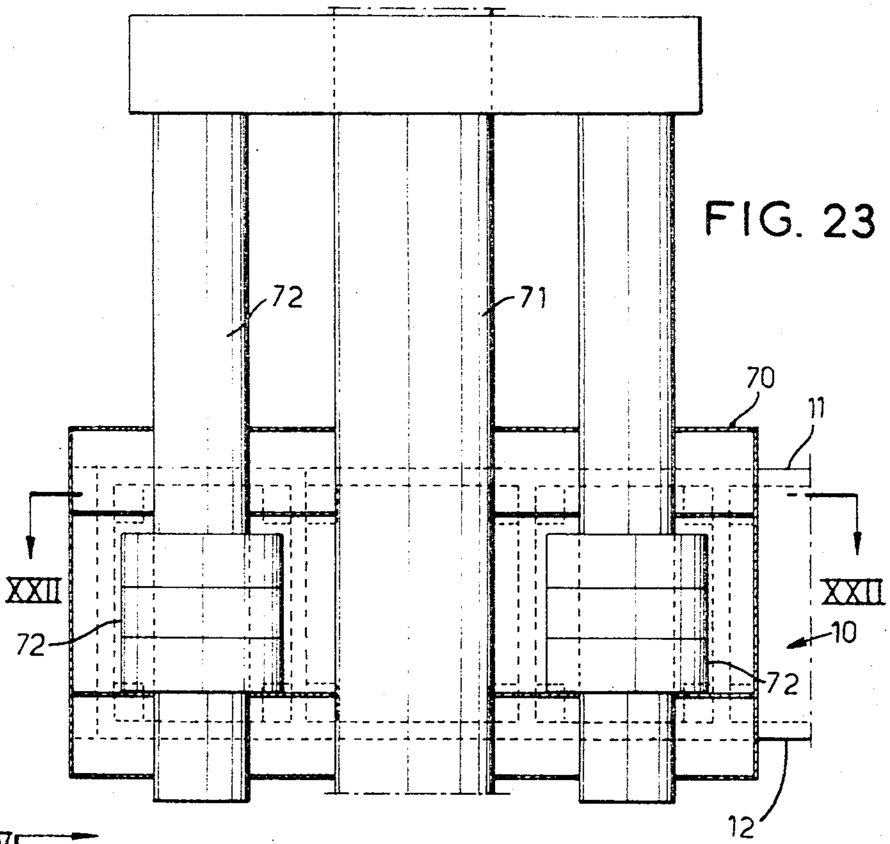
FIGURES 22 to 25 show a modified mounting method of the provisional piles on the platform.
Figure 22:
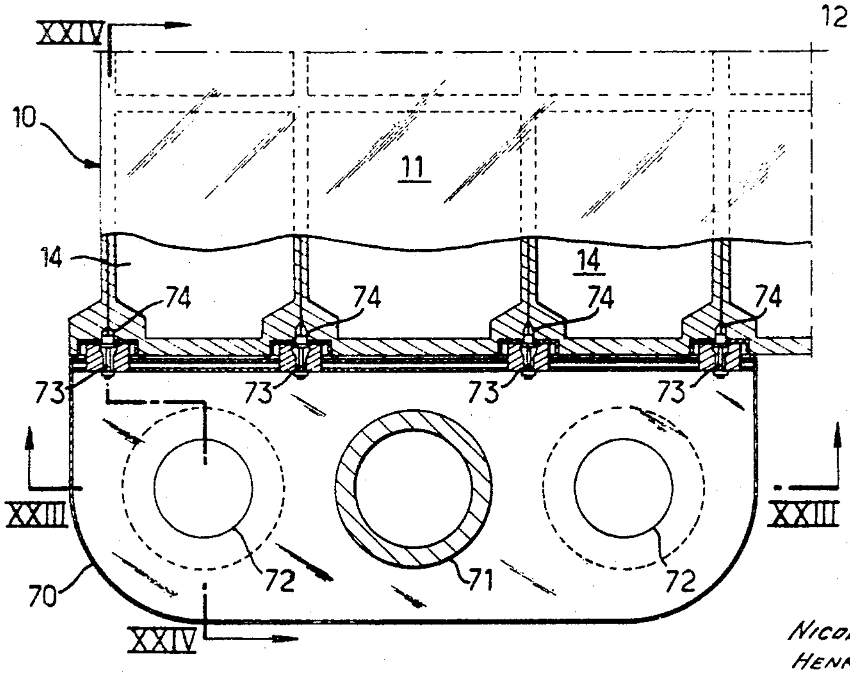
Figure 24:
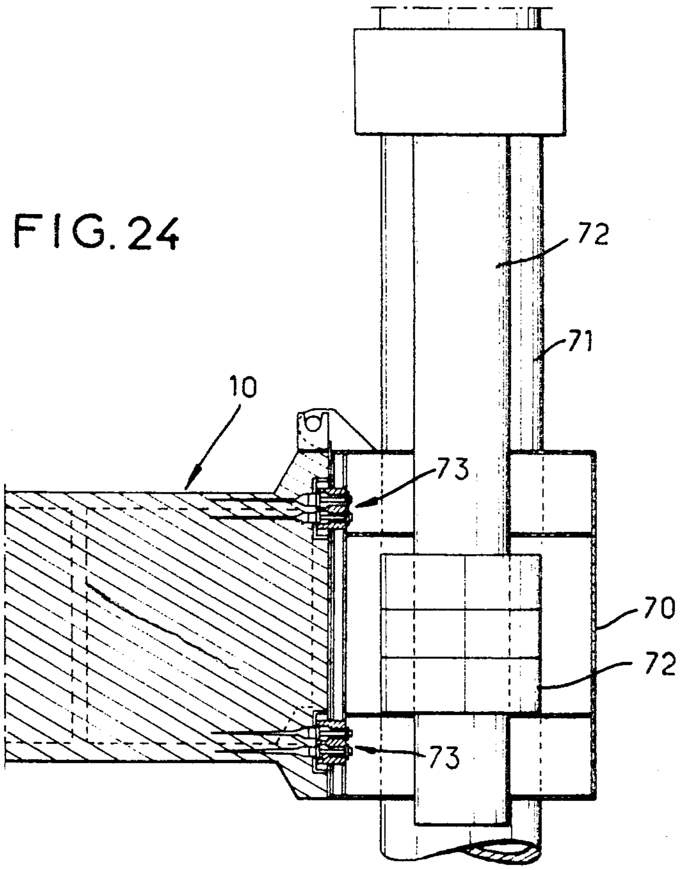
Figure 25:
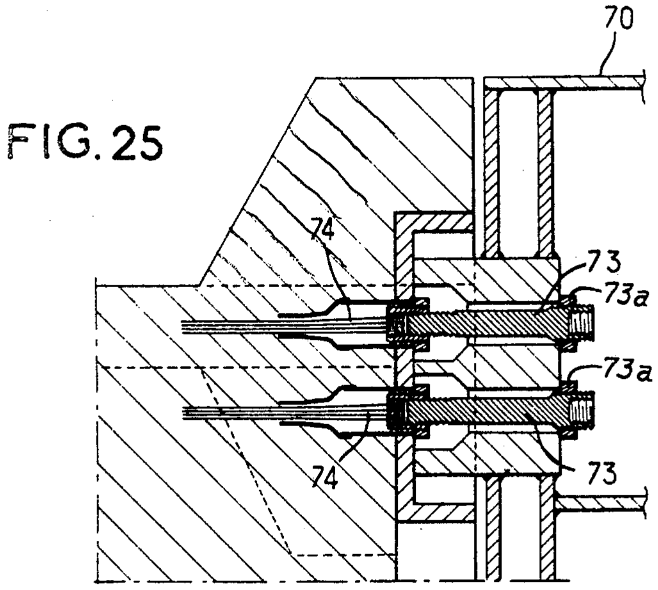
Figures 26, 27, 28, 29, 30, 31:
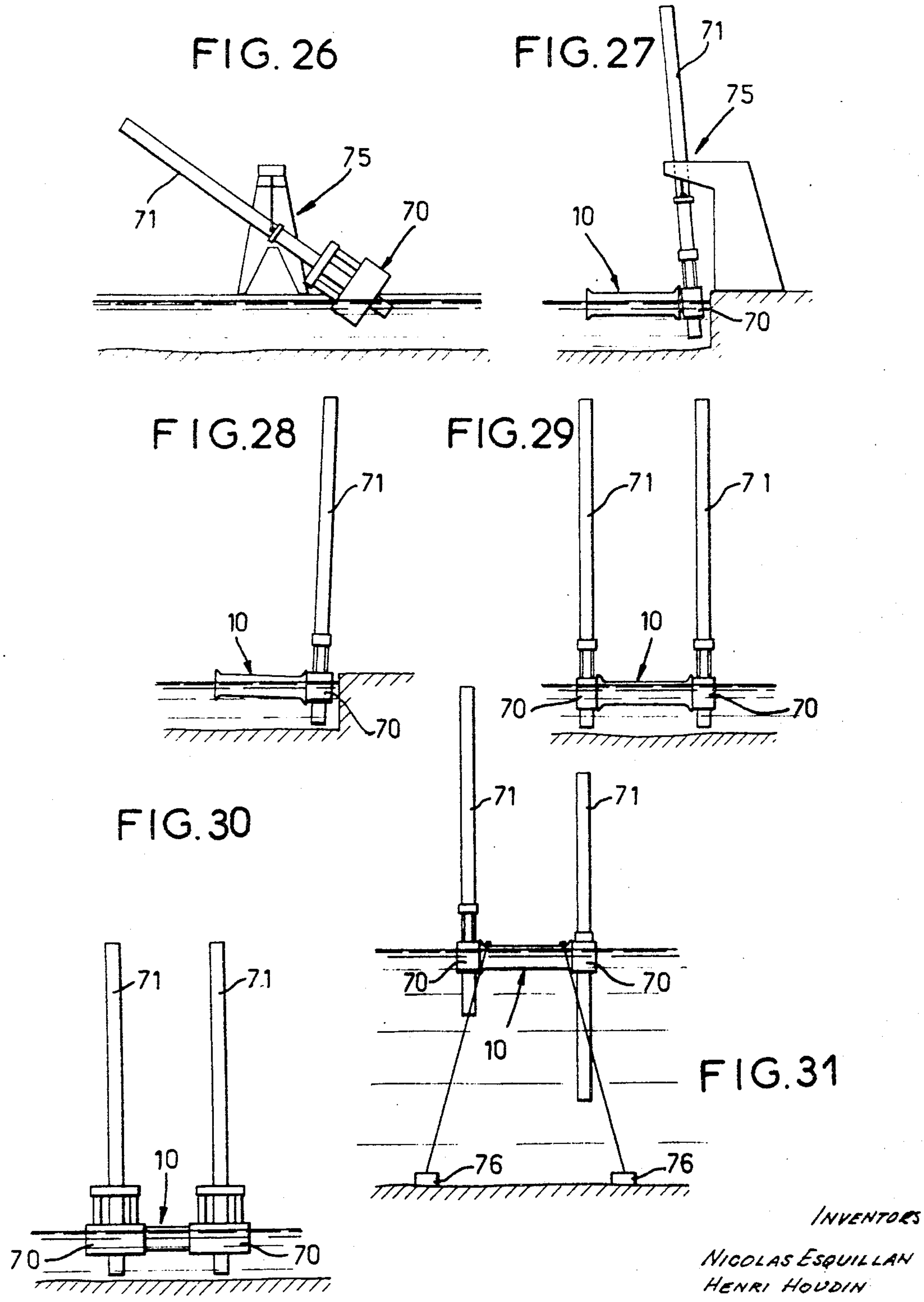
FIGURES 26 to 38 show diagrammatically the method of construction of a rig of the type shown in FIGURES 22 to 25.

Each of the permanent piles is produced according to a conventional technique, which is described briefly with reference to FIGURES 20 and 21 in particular. A first operation consists of inserting and then sliding a metal tube 57 into an inclined well, which tube may be made in one piece or produced by welding together tube-sections on the platform in step with the lowering of the tube; when the lower extremity of this tube reaches the bed below the rig, a drilling mechanism 58 is inserted into the tube and drilling is performed down to the depth of engagement precalculated for the permanent pile. Once the required depth is reached, the drilling tool is drawn out, and prefabricated sheaths 59 of concrete are inserted into the tube 57, the column of sheaths obtained being calculated so as to have an apparent density very close to 1. This operation is shown at the left of FIGURE 20; in step with their descent, these sheaths are assembled by means of prestressing cables or bars.

When the column of sheaths thus formed reaches its overall length, that is to say when the first sheath inserted bears against the bottom of the bore and the last sheath is engaged in the well, the tube 57 is removed by means of a device shown diagrammatically at 60 (FIGURE 21). At the same time as this extraction, colloidal mortar is injected by means of pipes 61 judiciously situated in the sheaths, the mortar spreading and filling the annular space 62 formed by the tube 57 between the outer surface of the sheaths and the side of the bore; this injection being performed in such manner as to fill the bore along the depth of engagement of the pile in the firm ground. When this operation has been completed, concrete is poured into the inside of the sheathing column through a duct 63 inserted into the column and opening at its upper end at 64 in alignment with an angularly displaceable apparatus 65 (FIGURE 21), after which colloidal mortar is injected at the tip of the pile to ensure and adjust its bearing force.

Figure 14:
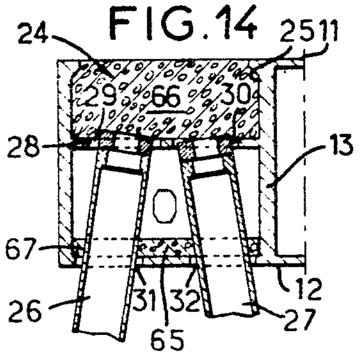
FIGURES 14 and 15 show the fastening or clamping of the permanent piles in the platform, on an enlarged scale and in cross section along the lines XIV—XIV and XV—XV respectively of FIGURE 11.
Figure 15:
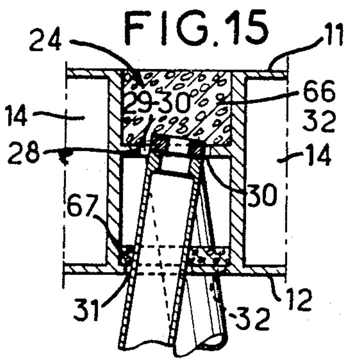
Figure 16:
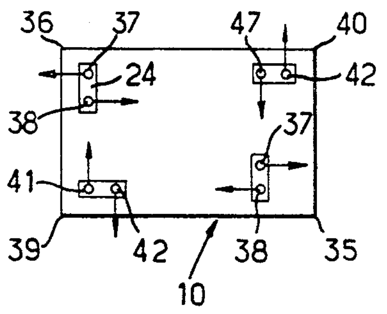
FIGURES 16 and 19 show diagrammatically different arrangements of the permanent piles relative to the structure forming a platform.

When all the piles have been produced in this manner, they are interlinked provisionally, and then immobilised finally in the platform by casting concrete at 66 and 67 respectively (FIGURES 14 and 15) into the compartments 24. When the concrete has set, the provisional piles are removed (FIGURE 9), and may subsequently be employed in the construction of other rigs.

Figure 9:
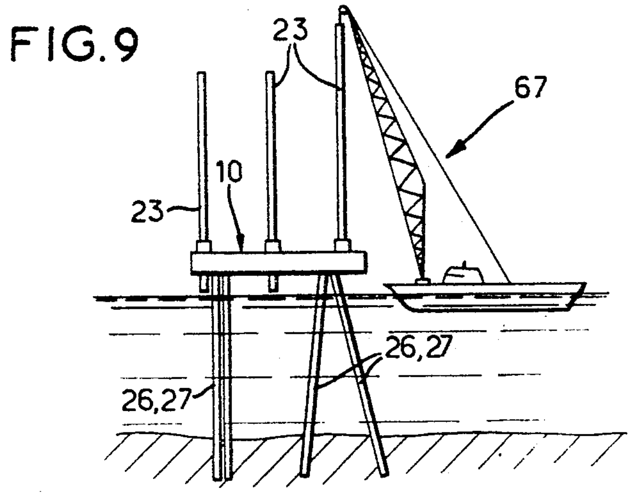
Figure 10:
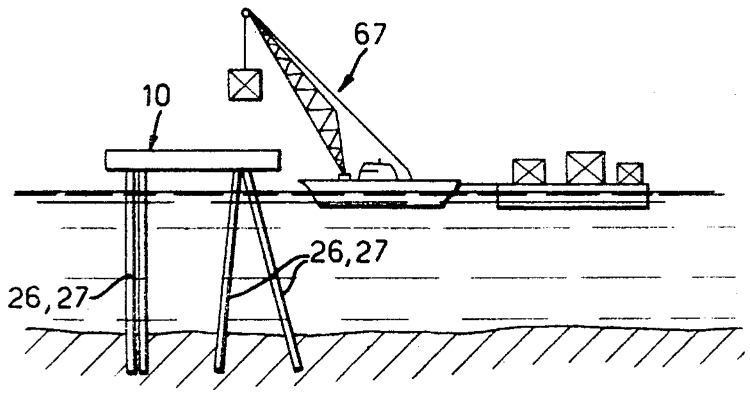

The rig thus produced may then receive all the equipment required for its operation, for example oil drilling plant, as well as the equipment needed for subsequent exploitation of the petroleum fields. The placing in position of such equipment may be performed in any appropriate manner, specifically by means of a floating crane 67 (FIGURES 9 and 10).

In the case in which several structural units such as those above are to be produced, it is advantageous to have available devices for handling and locating the provisional piles, which are not integral with the platform, but which form a part of the structure which is initially floatable and is raised on the provisional piles.

Such a device, intended to be clamped to each corner of the platform, is shown in FIGURES 22 to 25 in particular. It consists essentially of a metal caisson 70 adapted to receive a provisional pile 71 on the one hand, and on the other the mechanisms needed for forcing the provisional pile downwardly, such as jacks, collars or the like, indicated at 72. This metal caisson is devised to float and is moreover arranged for fastening to the platform by means of fixing devices 73, which utilise the head or end pieces of prestressing cables 74 of the platform, as particularly shown in FIGURES 24 and 25.

A fastening operation consists in screwing a prestressing jack (not shown) to the socket end of device 73, applying on said device a traction force preferably equal to that of the tensioned cable 74, tightening nut 73*a* against abutting face of caisson 70 and removing the prestressing jack. An unfastening operation consists in re-positioning the prestressing jack, applying on device 73 a traction force sufficient to loosen nut 73*a* to allow for unscrewing it, removing the jack and removing device 73 from the socket end of cable 74.

Such fastening and unfastening operations are well known in the technique of prestressing.

The metal caisson may equally incorporate devices for hoisting the provisional piles.

It will be understood that a certain number of metal caissons and consequently of provisional piles may be fitted to the platform, and that after completion of the permnaent piles produced as previously described, they may easily be separated from the platform and towed to another site for immediate re-use.

The placing in position of a structure comprising a platform equipped with caissons of the above nature may be performed as shown in FIGURES 26 to 38.

Figures 32, 33, 34:
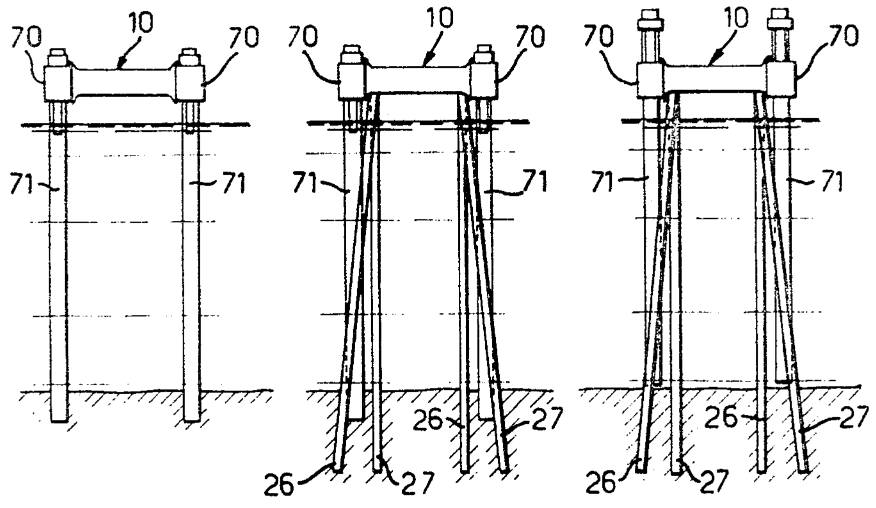
Figure 35:
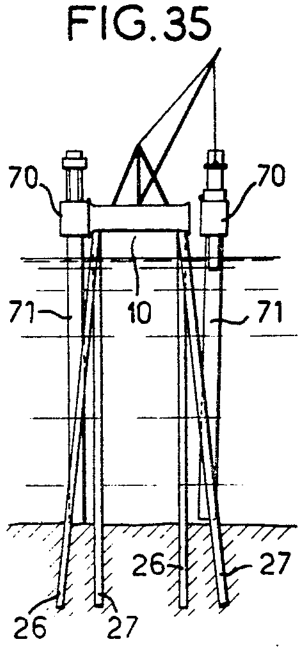
Figure 36:
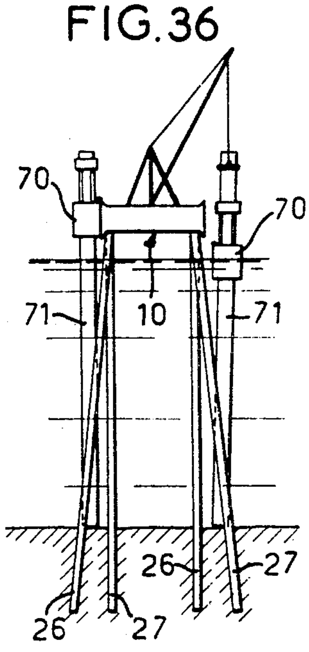
Figure 37:
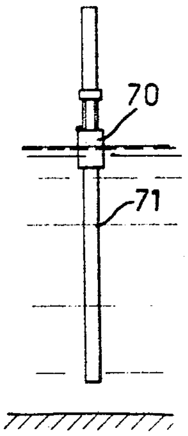
Figure 38:
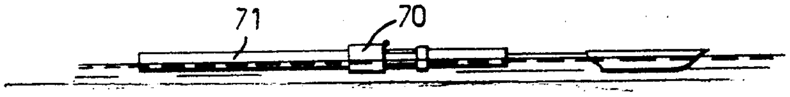

By means of appropriate hoisting mechanisms 75, the platform 10 is first equipped with caissons 70 bearing the provisional piles 71, after which the floating platform equipped with its provisional piles is towed to its working site, where it is anchored as previously by means of mooring blocks 76 (FIGURE 31); the jacks of the caissons are then actuated and by reaction cause structure to lift (FIGURE 32). As previously, drilling is performed, followed by the construction of the permanent piles 26, 27, after which the provisional piles 71 are extracted by operating the jacks of the caissons (FIGURES 33 and 34). When these piles have been extracted from the ground, the separation of the caissons from the platform is performed by means of a hoisting mechanism 77 (FIGURE 35); the pile is then ballasted to ensure its stability in a vertical position (FIGURES 36 and 37). The next operation consists of fending the provisional pile off the platform, then of removing its ballast, thus causing the whole assembly of provisional pile and caisson to tip to the horizontal position, after which this assembly is towed to another site (FIGURE 38).

It will be understood that the number of permanent piles and their characteristics will be calculated as a function of the operating conditions of the structures.

In general manner, the arrangements such as those described above ensure the highest resistance against the external and internal stresses imposed on the structure, that is to say by the swell, currents, wind, its own weight and additional loads, and allows of very slight displacement in the horizontal plane under the action of maximum forces.

The invention is evidently not limited to the forms of application selected and illustrated and given by way of example with reference to the drawings, which may on the contrary form the object of modifications without thereby exceeding the scope of the invention.

We claim:

1. A rig for supporting equipment above a surface of water at a selected site, comprising a floatable structure, a set of at least three provisional piles mounted on and vertically movable with respect to said structure and longer than the depth of water at the selected site, pile raising and lowering equipment mounted on said structure, a rectangular platform forming part of said structure, and two permanent pile wells in each of the four corners of said platform shaped to receive a pair of oppositely raking permanent platform support piles, the pairs of piles of two diagonally opposite platform corners being parallel to one vertical plane direction and the pairs of piles of the two other corners being parallel to one other vertical plane direction, said vertical plane directions being disposed substantially at right angles to each other, said rig being entirely carried by said four pairs of raking piles.

2. A rig as recited in claim 1, wherein said vertical plane directions are parallel to respective pairs of parallel sides of said platform and perpendicular to each other.

3. A rig for supporting equipment above a surface of water at a selected site, comprising a floatable structure, a set of at least three provisional piles mounted on and vertically movable with respect to said structure and longer than the depth of water at the selected site, pile raising and lowering equipment mounted on said structure, a rectangular platform forming part of said structure, and two permanent pile wells in each of the four corners of said platform shaped to receive a pair of outwardly raking permanent platform supporting piles, one of said piles of said pair being disposed in a plane parallel to one of the platform sides and the other said pile of said pair being disposed in a plane parallel to the other of the platform sides meeting at said corner, said rig being entirely carried by said four pairs of raking piles.

4. A rig for supporting equipment above a surface of water at a selected site, comprising a floatable structure, a set of at least three metal caissons each having a provisional pile mounted on and vertically movable with respect to said structure, and longer than the depth of water at the selected site, provisional pile raising and lowering equipment mounted on said structure, a platform forming a part of said structure, and permanent piles for providing permanent support thereto, wherein said structure includes removably connectable subassemblies each consisting of one provisional pile and one metal caisson having a pile raising and lowering device therefor, wherein the platform is of prestressed concrete and includes prestressed cables, said cables removably connecting the metal caissons to sides of said platform.

References Cited

UNITED STATES PATENTS

| | | | |
|---|---|---|---|
| 2,592,448 | 4/1952 | McMenimen | 61—46.5 |
| 2,667,038 | 1/1954 | Bayley | 61—46.5 |
| 2,775,869 | 1/1957 | Pointer | 61—46.5 |
| 2,877,629 | 3/1959 | DeLong et al. | 61—46.5 |
| 2,927,435 | 3/1960 | Upson | 61—46 |
| 3,208,228 | 9/1965 | Paulet | 61—46 X |
| 3,255,591 | 6/1966 | Thornley | 61—46 |

FOREIGN PATENTS

| | | |
|---|---|---|
| 751,775 | 7/1956 | Great Britain. |

OTHER REFERENCES

The Military Engineer (publ.), Nov.-Dec. 1955 (No. 320), pages 436 to 439.

JACOB SHAPIRO, Primary Examiner

U.S. Cl. X.R.

61—52